United States Patent [19]

Rottmaier et al.

[11] 4,456,715
[45] Jun. 26, 1984

[54] FLAMEPROOF POLYAMIDE MOULDING COMPOSITIONS

[75] Inventors: Ludwig Rottmaier, Odenthal; Rudolf Merten, Leverkusen, both of Fed. Rep. of Germany; Wolfgang Siebourg, Pittsburgh, Pa.; Burkhard Lachmann, Meerbusch, Fed. Rep. of Germany

[73] Assignee: Bayer Aktiengesellschaft, Leverkusen, Fed. Rep. of Germany

[21] Appl. No.: 278,604

[22] Filed: Jun. 29, 1981

[30] Foreign Application Priority Data

Jul. 21, 1980 [DE] Fed. Rep. of Germany ....... 3027617

[51] Int. Cl.³ .............................................. C08K 5/34
[52] U.S. Cl. .................................... 524/100; 524/101; 524/400; 524/401
[58] Field of Search ................................ 524/100, 101

[56] References Cited

U.S. PATENT DOCUMENTS

| | | | |
|---|---|---|---|
| 3,281,392 | 10/1966 | Oddo et al. | 524/101 |
| 3,660,344 | 5/1972 | Michael et al. | 524/100 |
| 3,793,289 | 2/1974 | Koch et al. | 524/100 |
| 3,888,822 | 6/1975 | Gilleo et al. | 524/100 |
| 3,980,616 | 9/1976 | Kimura et al. | 524/101 |
| 4,001,177 | 1/1977 | Tsutsumi et al. | 524/101 |
| 4,185,007 | 1/1980 | Rasberger et al. | 524/101 |
| 4,193,945 | 3/1980 | Bertelli et al. | 524/106 |
| 4,298,518 | 11/1981 | Ohmura et al. | 524/101 |

FOREIGN PATENT DOCUMENTS 2730503 1/1978 Fed. Rep. of Germany.

Primary Examiner—John Kight, III
Assistant Examiner—R. A. White
Attorney, Agent, or Firm—Connolly and Hutz

[57] ABSTRACT

Self-extinguishing thermoplastic polyamide moulding compositions containing barbituric acid and/or reaction products thereof as flameproofing agent.

4 Claims, No Drawings

FLAMEPROOF POLYAMIDE MOULDING COMPOSITIONS

Various processes for rendering thermoplastic polymers flame-resistant and fire-retardant have already been proposed. The process most frequently adopted involves adding a flame-proofing agent to the resin. Known fire-retarding agents include halogen-containing compounds and nitrogen-containing compounds.

Halogen compounds together with synergistically acting metal compounds or pulverised red phosphorus are used nowadays on a commercial scale as highly effective fire-proofing agents for polyamide moulding compositions. These fire-proofing agents and the use thereof are described, for example, in U.S. Pat. No. 3,418,267, in German Auslegeschrift No. 1,694,494, German Offenlegungsschrift No. 2,544,219 and German Auslegeschrift No. 1,931,387.

Halogen compounds have the disadvantage that they reduce the creep resistance of the polyamide moulding compositions and, in the event of fire, give off hydrogen halide which can cause considerable corrosion in the vicinity of the fire. Moulding compositions containing halogen compounds give off a small amount of hydrogen halide at the high processing temperature needed in the processing machines, and this can damage the machines.

Powdered red phosphorus can only be handled with difficulty as it tends to cause dust explosions in the presence of air upon contact with hot metal surfaces.

An additional disadvantage lies in the ease with which toxic phosphorus-hydrogen compounds are formed at the high processing temperatures of the moulding compositions. Numerous additional processing stages have been recommended to restrict this development as far as possible as described, for example, in German Auslegeschrift Nos. 2,308,104; 2,625,673 and 2,625,691.

Finally, the inherent red colour of the phosphorus makes it difficult to adjust light colours in the moulding compositions. The quantity of white pigments needed to cover the red colouration impairs the mechanical properties.

The addition of melamine (German Auslegeschrift No. 1,694,254), the addition of cyanuric acid U.S. Pat. No. 3,980,616) and the addition of both melamine and cyanuric acid (U.S. Pat. No. 4,001,177) have been proposed for the flame-proof finishing of polyamide moulding compositions.

A satisfactory flame-proof finish is obtained if melamine is added, but the melamine can sublime under the moulding conditions and form a deposit on the mould. This phenomenon is known as "flattening out". It leads to undesirable loosening or to flecking of the moulded article.

The appearance of the products is therefore sometimes unsatisfactory.

If cyanuric acid is added, the mechanical properties of the moulded article are impaired with small quantities of flame-proofing agent and considerable efflorescence is observed. If cyanuric acid and melamine are added, it is necessary to use at least 10 parts by weight to 100 parts by weight of polyamide resin in order to obtain a satisfactory flame-proof finish. The "flattening out" and the "efflorescence" are not negligible in this case either.

By using the flameproofing agent according to the invention it is possible to produce a polyamide moulding composition which has satisfactory flame-proof characteristics, is suitable for the production of moulded articles and, in particular, permits flameproofed polyamide moulding compositions to be produced in light colours, as all components are almost colourless or white.

The present invention therefore provides self-extinguishing, thermoplastic polyamide moulding compositions containing from 0.1 to 20% by weight, based on the total moulding composition, of barbituric acids and/or reaction products of barbituric acids with preferably melamine or melamine derivatives, and optionally up to 60% by weight, based on the total moulding compositions, of reinforcing materials and/or fillers and optionally other conventional auxiliaries and/or additives.

Suitable thermoplastic polyamide resins include polyamides which are obtained by polymerisation of a lactam with at least 5 ring members or a corresponding $\omega$-aminocarboxylic acid such as, for example $\epsilon$-caprolactam, aminocaproic acid, enatholactam, 7-aminohexanoic acid, 9-aminononanoic acid, 11-aminoundecanoic acid, $\alpha$-pyrrolidone and piperidone; also polyamide resins which are obtained by polycondensation of aliphatic diamines such as hexamethylenediamine, 2,2,4-, 2,4,4-trimethylhexamethylenediamine, isophoronediamine, 1,3-, 1,4-bisaminocyclohexane, bisamino cyclohexylalkanes, xylylene diamine and aliphatic or aromatic dicarboxylic acids such as adipic acid, sebacic acid, azelaic acid, dodecanoic acid, glutaric acid, cyclohexane dicarboxylic acid, isophthalic acid and terephthalic acid.

Polyamides produced from the above-mentioned aliphatic dicarboxylic acids and aromatic diamines such as, for example, 1,3- and 1,4-diaminobenzene can also be used, as well as polyamide mixtures and copolyamides of all the above mentioned components, providing aliphatic or partially aliphatic polyamides are formed. Polyamide-6 and polyamide-6,6 are particularly preferred.

The polyamide resin can also contain other resins, for example polyester, polyolefins, polytetrafluoroethylene, ABS, AS or ethylene-vinylacetate copolymers.

It is preferable to use as flame-proofing agents barbituric acids corresponding to general formula (I):

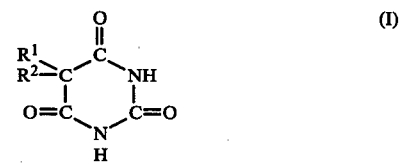

wherein
R$^1$ and R$^2$, which may be the same or different, represent, independently of each other, hydrogen, an aliphatic, C$_1$–C$_{10}$, preferably C$_1$–C$_4$, cycloaliphatic C$_4$–C$_{10}$, preferably C$_5$–C$_6$, araliphatic C$_7$–C$_{12}$, preferably C$_7$–C$_{10}$ or aromatic C$_6$–C$_{10}$, preferably phenyl radical.

Suitable reaction products of the barbituric acids to be used according to the invention preferably include salts corresponding to general formula (II):

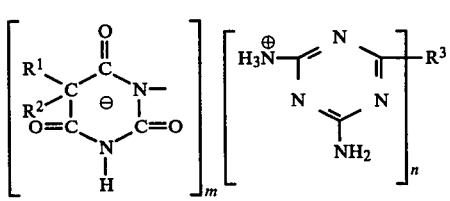

wherein
- $R^1$ and $R^2$ have the meaning given above, $R^3$ represents hydrogen, amino group, an optionally halogen-substituted aliphatic $C_1$–$C_{20}$, preferably $C_1$–$C_{10}$, cycloaliphatic $C_4$–$C_{17}$, preferably $C_5$–$C_{10}$ araliphatic $C_7$–$C_{17}$, preferably $C_7$–$C_{10}$, or aromatic $C_6$–$C_{15}$, preferably $C_6$–$C_{10}$ radical,
- n represents 1 to 4, and
- m represents 1 to n.

Barbituric acid salts formed from barbituric acid or dimethyl barbituric acid or diethyl barbituric acid and melamine and/or 2-methyl- and/or 2-phenyl-4,6-diamino-1,3,5-triazine and/or 1,2-bis(4,6-diamino-1,3,5-triazin-2-yl)ethane and/or 1,4-bis(4,6-diamino-1,3,5-triazin-2-yl)butane and/or 1,6-bis- and/or 1,3,6-tris(4,6-diamino-1,3,5-triazin-2-yl)hexane are particularly preferred. The melamine barbiturate produced from 1 mol of barbituric acid and 1 mol of melamine is used as a particularly preferred salt corresponding to general formula (II), i.e. $R^3$ represents $NH_2$.

These barbituric acid salts are produced from barbituric acids and the corresponding triazine derivatives optionally under an elevated pressure at temperatures of from 20° to 130° C., preferably in suitable solvents, preferably water.

Other reaction products of the barbituric acids to be used according to the invention preferably include Mannich bases corresponding to general formula (III):

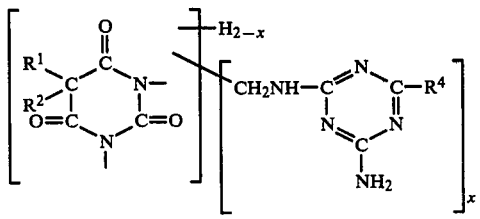

wherein
- $R^1$ and $R^2$ have the meaning given above, $R^4$ represents hydrogen, an amino group, an optionally halogen-substituted aliphatic $C_1$–$C_{20}$, preferably $C_1$–$C_{10}$; cycloaliphatic $C_4$–$C_{17}$, preferably $C_5$–$C_{10}$ araliphatic $C_7$–$C_{17}$ preferably $C_7$–$C_{10}$; or aromatic $C_6$–$C_{15}$, preferably $C_6$–$C_{15}$, preferably $C_6$–$C_{10}$ radical, and
- x represents 1 or 2 with the proviso that when x is 1, $R^4$ is an amino group.

Other reaction products of the barbituric acids to be used according to the invention preferably include Mannich bases produced therefrom corresponding to general formula (IV):

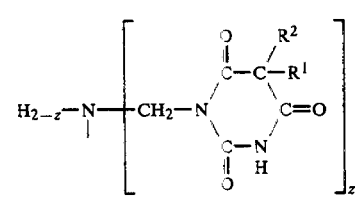

wherein
- $R^1$ and $R^2$ have the meaning given above,
- $R^5$ represents hydrogen, an optionally halogen-substituted aliphatic $C_1$–$C_{20}$, preferably $C_1$–$C_{10}$ cycloaliphatic $C_4$–$C_{17}$, preferably $C_5$–$C_{10}$ araliphatic $C_7$–$C_{17}$, preferably $C_7$–$C_{10}$ or aromatic $C_6$–$C_{15}$ preferably $C_6$–$C_{10}$ radical, or a radical corresponding to general formula (IVa):

$$\left[ H_{2-z}-N-\left[CH_2-N\underset{\underset{O}{\overset{|}{C}}-N}{\overset{\overset{O}{\overset{||}{C}}-\overset{R^2}{\underset{R^1}{\overset{/}{C}}}}{\diagdown}}\begin{matrix}\\C=O\\ \\H\end{matrix}\right]_z \right] \quad \text{(IVa)}$$

- y represents 1 to 4, and
- z represents 1 to 2.

In particular, Mannich condensates formed from barbituric acids, formaldehyde and melamine in a ratio of from 1:1:1 to 1:2:2 are used.

The Mannich condensates produced from barbituric acids to be used according to the invention and corresponding to general formulae (III) and (IV) are obtained by reacting barbituric acids with formaldehyde, preferably as an aqueous solution, and the corresponding triazine derivatives, optionally in the presence of suitable catalysts, at temperatures of from 10° to 180° C., optionally under elevated pressure.

Barbituric acids or reaction products of barbituric acids are added to the polyamide resin in a quantity of from 0.1 to 20% by weight. A quantity of from 0.1 to 5% by weight, preferably from 0.5 to 3% by weight, is sufficient for adequate flame-protection when using barbituric acids. The reaction products of barbituric acids, on the other hand, are generally added to the polyamide resin in a quantity of from 1 to 20% by weight, preferably from 3 to 15% by weight. Mixtures of barbituric acids and the reaction products of the barbituric acids can obviously also be used. It is obviously also possible to add other flame-proofing agents, for example halogen compounds or red phosphorus to the flame-proofing agents according to the invention.

Reinforcing materials and fillers can be contained in the polyamide moulding compositions according to the invention in quantities of up to 60% by weight. These include: glass fibres, carbon fibres, asbestos fibres, glass beads, talcum, mica, wollastonite, microvite, chalk, silicon dioxide, graphite, gypsum and other conventional additives such as pigments and dyes, i.e. cadmium sulphide, phthalocyanine or titanium dioxide.

As further flame-proofing agents, copper compounds or a mixture of a copper compound and an alkali metal halide can be added in quantities of from 0.001 to 1% by weight to the polyamide moulding compositions according to the invention.

Suitable copper compounds include inorganic and organic copper salts. Examples thereof include copper-I-chloride, copper-II-sulphate, copper-I-iodide, copper-II-phosphate, copper-II-acetate, copper-II-stearate, copper-II-benzoate and copper-chelate compounds. Suitable alkali metal halides include potassium iodide, potassium bromide, sodium chloride and sodium bromide.

Aromatic and/or higher aliphatic carboxylic acids as well as the alkali metal or alkaline earth metal salts thereof, such as, for example, sodium stearate, calcium stearate, isophthalic acid or terephthalic acid can be incorporated in quantities of from 0.1 to 1% by weight into the polyamide resin compositions according to the invention as auxiliaries and additives.

It is also possible to add any known antistatic agents such as conductive carbon black or quaternary ammonium salts.

The additives can be mixed with the polyamide resin by various known methods, preferably prior to moulding. The simplest method involves mixing the additives with the polyamide resin in dry form. The dry mixed mass can then be extruded for the production of granulates from the melt, and the additives can also be added to the plasticised polyamide resin composition in the extruder by means of known metering devices. It is also possible firstly to produce master batch granulates by adding large quantities of the additives to the polyamide resin and then mixing these master batch granulates with the polyamide resin.

The mouldings can be produced by moulding the mass or the granulates using various moulding machines, extruding machines, pressing machines or the like. The additives can also be incorporated by means of the moulding machine.

The temperatures needed for incorporation of the additives are determined essentially by the melting temperature of the polyamide to be incorporated. The processing temperature should usually be at least 10° C., but not more than 30° C., above the softening temperature of the polyamide. For example, it is below 270° C. for polyamide-6,6, whereas temperatures of less than 250° C. are adequate for polyamide-6.

The polyamide moulding compositions of the present invention have excellent flame-resistance and excellent mechanical properties and an excellent moulding and compression capacity which leads neither to flattening nor to efflorescence. The polyamide resin compositions are obtainable in light colours.

In the following Examples, the percentages are percentages by weight, and parts are parts by weight.

EXAMPLES (A) Production of the melamine barbiturate.

12.8 kg of barbituric acid are added to a mixture of 12.6 kg of melamine and 100 l of water at 95° C. To complete the reaction, the mixture is stirred for 3 hours at 95° C. and suction filtered whilst hot, washed with hot water and dried at 80° C. in a circulating air drying cabinet to constant weight (yield 25 kg=98.4% of the theoretical yield). The IR-spectrum and elemental analysis confirm the assumed salt structure.

Calculated for $C_7H_{10}N_8O_3$: C=33.1% H=3.94% N=44.1%: Found: C=33.2% H=4.0% N=43.8%.

(B) Production of a Mannich base from melamine, formaldehyde and barbituric acid.

1.02 kg of barbituric acid are added in portions at <50° C., with stirring, to 2.46 kg of a 37% aqueous formaldehyde solution which has been adjusted to pH 9 using caustic soda solution. The reaction is exothermic and can easily be controlled by cooling with iced water. The mixture is then stirred for 1 hour at 50° C. and a clear solution predominantly of dimethylol-barbituric acid is formed. The dimethylol compound is reacted with 90 l of water and 3.78 kg of melamine and is heated to a slight reflux. To complete the reaction, the mixture is stirred for 3 hours with a slight reflux and then suction filtered whilst hot and washed with hot water. After drying at 100° C. in a circulating air drying cabinet, 5.7 kg of Mannich condensate are obtained, of which the structure is confirmed by IR-spectrum and elemental analysis.

Calculated for $C_{12}H_{16}N_{14}O_3$: C=35.6% H=3.96% N=48.5%: Found: C=35.8% H=4.0% N=48.3%.

EXAMPLES 1–8

The flame-proofing agents according to the invention were incorporated into the polyamides, optionally together with glass fibres, on a double shaft extruder ZSK 53 made by Werner & Pfleiderer under the conditions which are usual for polyamides. The strand drawn off is cooled, granulated and dried. The granulate is then injected on an injection moulding machine A 270 made by Arburg into samples measuring 127×12.7×1.6 mm.

These samples are stored for 24 hours at 23° C. and 50% relative air humidity and then tested in accordance with Underwriters Laboratories (UL) Subject 94 "Vertical burning test for classifying materials".

Table 1 lists the compositions of the samples, their classification according to UL Subject 94 as well as the after burning times from 10 flame-treatments, in order to illustrate the improved fire-proof effect.

No flattening phenomena could be detected in any samples during or after the injection process, even over a prolonged period. After storage for 7 days at 70° C. in a drying cabinet, all samples maintained their surface lustre.

TABLE 1

| Test No. | Polyamide | % By weight in the mixture | Flame-proofing agents in % by weight | Other Additives | UL Subject 94 127 × 12.7 × 1.6 (mm) | After-burning time (secs) |
|---|---|---|---|---|---|---|
| 1 | PA 6 η *rel. 2.96 | 100 | — | — | V2 | 43 |
| 2 | as 1 | 98 | 2% barbituric acid | — | V2 | 10 |
| 3 | as 1 | 90 | 10% Example B | — | V0 | 10 |
| 4 | as 1 | 90 | 10% | — | V0 | 10 |

TABLE 1-continued

| Test No. | Polyamide | % By weight in the mixture | Flame-proofing agents in % by weight | Other Additives | UL Subject 94 127 × 12.7 × 1.6 (mm) | After-burning time (secs) |
|---|---|---|---|---|---|---|
| 5 | PA 66 η rel. 2.73 | 100 | Example A — | — | V2 | 31 |
| 6 | as 5 | 90 | 10% Example A | — | V0 | 11 |
| 7 | as 5 | 75 | — | 25% glass fibres | **not withstood | >>600 |
| 8 | as 5 | 65 | 10% Example A | 25% glass fibres | V2 | 74 |

*Relative viscosity measured on a solution of 1 g of polyamide in 100 ml of m-cresol at 25° C.
**Sample burns to the holding clamp

We claim:

1. A self-extinguishing thermoplastic polyamide moulding composition which comprises a thermoplastic polyamide and from 0.1 to 20% by weight, based on the total composition, of a flame proofing agent selected from the group consisting of those of the formulae

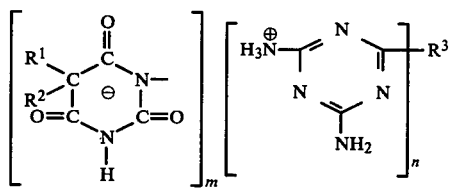

wherein $R^1$ and $R^2$, which may be the same or different, represent independently of each other hydrogen, a $C_1-C_{10}$ aliphatic radical, a $C_4-C_{10}$ cycloaliphatic radical, a $C_7-C_{12}$ araliphatic radical or a $C_6-C_{10}$ aromatic radical; $R^3$ is hydrogen, an amino group, an aliphatic $C_1-C_{20}$ radical, a cycloaliphatic $C_4-C_{17}$ radical, an araliphatic $C_7-C_{17}$ radical, an aromatic $C_6-C_{15}$ radical or one of said radicals substituted with halogen; n is 1 to 4 and m is 1 to n;

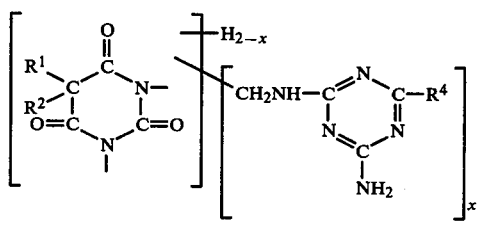

wherein $R^1$ and $R^2$ are as aforesaid, $R^4$ is hydrogen, an amino group, an aliphatic $C_1-C_{20}$ radical, a cycloaliphatic $C_4-C_{17}$ radical, an araliphatic $C_7-C_{17}$ radical, an aromatic $C_6-C_{15}$ radical or one of said radicals substituted with halogen, and x is 1 or 2 with the proviso that when x is 1, $R^4$ is an amino group and

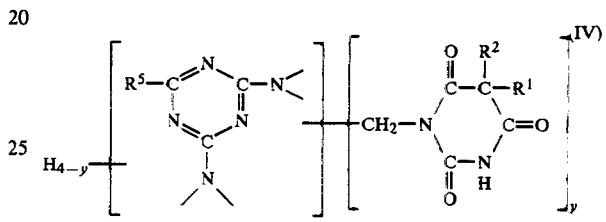

wherein $R^1$ and $R^2$ are as aforesaid, y is 1 to 4, $R^5$ is hydrogen, an aliphatic $C_1-C_{20}$ radical, a cycloaliphatic $C_4-C_{17}$ radical, an araliphatic $C_7-C_{17}$ radical, an aromatic $C_6-C_{15}$ radical, one of said radicals substituted with halogen or a radical of the formula

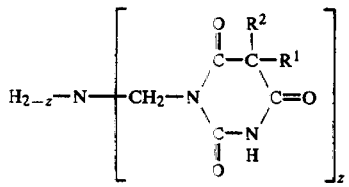

wherein $R^1$ and $R^2$ are as aforesaid and z is 1 or 2.

2. The self-extinguishing thermoplastic polyamide of claim 1 wherein the flame-proofing agent is of formula (II) and $R^3$ is an amino group.

3. A self-extinguishing thermoplastic polyamide of claim 1 wherein the flame-proofing agent is of formula (III) and $R^4$ is an amino group.

4. A self-extinguishing thermoplastic polyamide moulding composition of claim 1 containing up to 60% by weight, of at least one member selected from the group consisting of reinforcing materials, fillers and other conventional auxiliaries or additives.

* * * * *